(12) United States Patent
Gray

(10) Patent No.: US 12,710,634 B2
(45) Date of Patent: Aug. 18, 2026

(54) MICROSCOPE ILLUMINATOR

(71) Applicant: Mikroscan Technologies, Vista, CA (US)

(72) Inventor: Jeffrey Ross Gray, San Diego, CA (US)

(73) Assignee: Mikroscan Technologies, Vista, CA (US)

( * ) Notice: Subject to any disclaimer, the term of this patent is extended or adjusted under 35 U.S.C. 154(b) by 209 days.

(21) Appl. No.: 18/408,428

(22) Filed: Jan. 9, 2024

(65) Prior Publication Data

US 2024/0248293 A1 Jul. 25, 2024

Related U.S. Application Data

(60) Provisional application No. 63/440,653, filed on Jan. 23, 2023.

(51) Int. Cl.
*G02B 21/06* (2006.01)
*G02B 21/00* (2006.01)
*G02B 21/28* (2006.01)

(52) U.S. Cl.
CPC ......... *G02B 21/06* (2013.01); *G02B 21/0032* (2013.01); *G02B 21/0076* (2013.01); *G02B 21/28* (2013.01)

(58) Field of Classification Search
CPC ............... G02B 21/06; G02B 21/0032; G02B 21/0076; G02B 21/28; G02B 21/086; G02B 21/00
See application file for complete search history.

(56) References Cited

U.S. PATENT DOCUMENTS

| | | | | |
|---|---|---|---|---|
| 5,734,498 | A * | 3/1998 | Krasieva | G02B 21/06 359/368 |
| 7,133,547 | B2 * | 11/2006 | Marcelpoil | G06T 7/0012 382/129 |
| 7,826,648 | B2 * | 11/2010 | Arai | G06T 7/0012 356/402 |
| 8,977,017 | B2 * | 3/2015 | Otsuka | G06T 7/0012 382/128 |
| 2012/0127569 | A1 * | 5/2012 | Mizuta | G02B 21/086 359/385 |
| 2018/0373017 | A1 * | 12/2018 | Dixon | G02B 21/0024 |
| 2019/0033568 | A1 * | 1/2019 | Li | G02B 21/0036 |
| 2020/0355899 | A1 * | 11/2020 | Joo | G06T 7/0002 |
| 2021/0181673 | A1 * | 6/2021 | Ozcan | G01N 15/1434 |
| 2024/0069315 | A1 * | 2/2024 | Mevada | G02B 21/36 |
| 2025/0356637 | A1 * | 11/2025 | Almers | G02B 21/367 |

* cited by examiner

*Primary Examiner* — Balram T Parbadia
(74) *Attorney, Agent, or Firm* — Straylight LLP

(57) ABSTRACT

A microscope is disclosed that has a base, a slide holder configured to accept a slide, and an illuminator comprising a light-emitting surface configured to project light on an optical path toward the slide when the slide is accepted by the slide holder. There is no light-shaping apparatus disposed on the optical path between the illuminator and the slide holder.

11 Claims, 4 Drawing Sheets

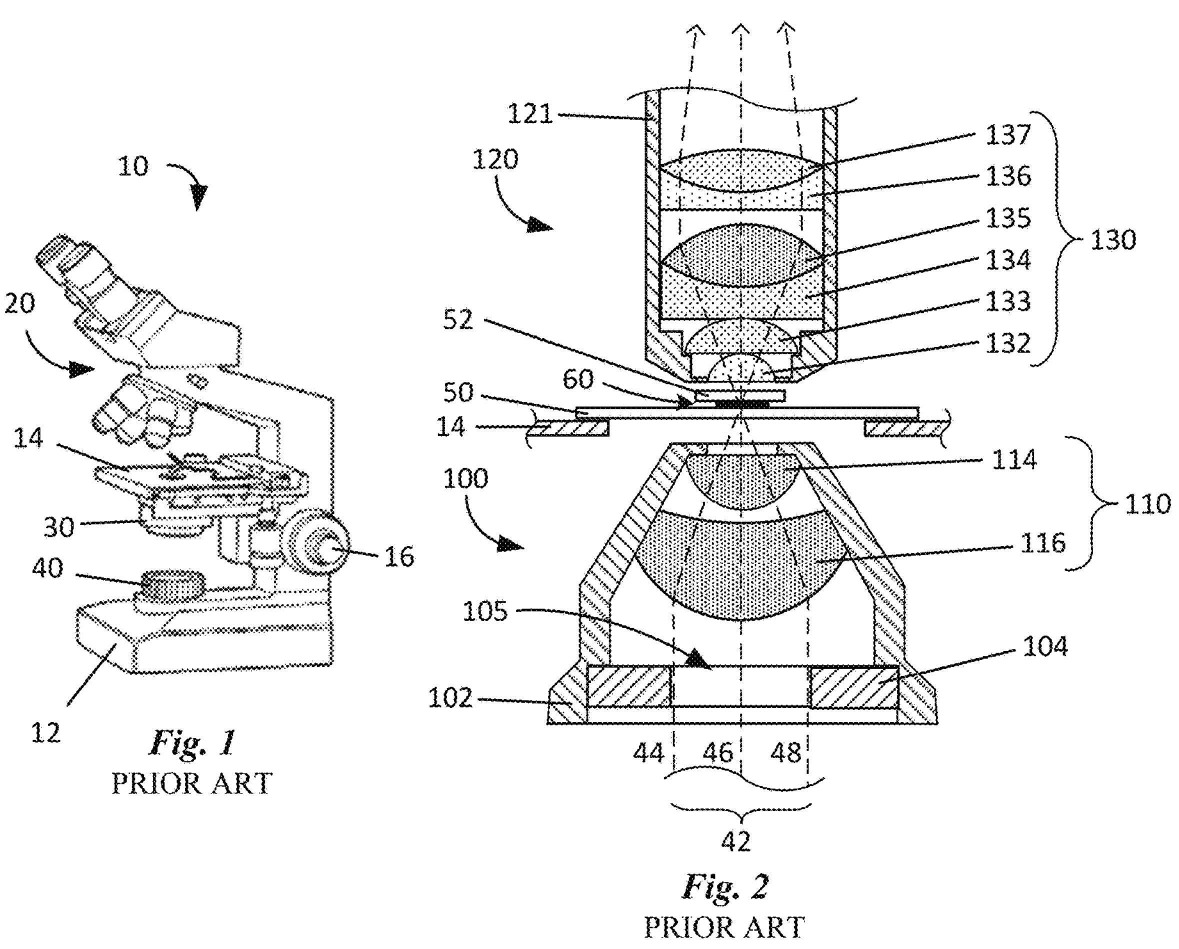
*Fig. 1*
PRIOR ART
*Fig. 2*
PRIOR ART
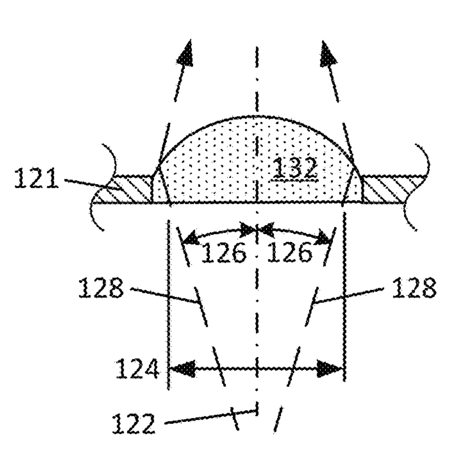
*Fig. 2A*
*(enlarged view of a portion of Fig. 2)*
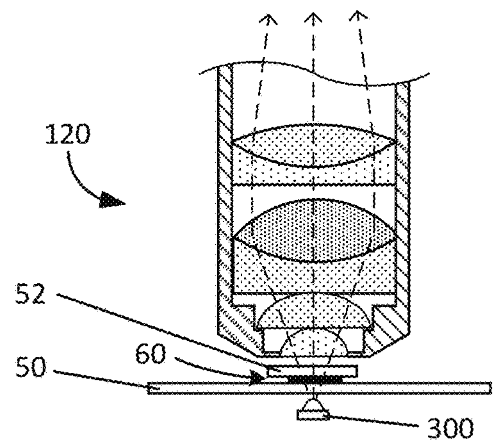
*Fig. 3*

MICROSCOPE ILLUMINATOR

CROSS-REFERENCE TO RELATED APPLICATIONS

This application claims priority to U.S. Provisional Applications 63/440,653 filed on Jan. 23, 2023, which is hereby incorporated in their entirety herein by reference.

STATEMENT REGARDING FEDERALLY SPONSORED RESEARCH OR DEVELOPMENT

Not applicable.

BACKGROUND

Field

The present invention generally relates to transmissive illumination of a sample in optical microscopy.

Description of the Related Art

The purpose of microscopic optical examination is to obtain a clear and focused image of a thin sample of material. In certain fields such as pathology, the sample is a thin slice of tissue.

Conventional microscopes minimize degradation of the image by avoiding formation of an image of the source of illumination, e.g., a filament lamp, at the observer's eye. This is commonly done by using Kohler illumination, developed by August Kohler in 1893 that incorporates optical elements between the light source and the slide. In this system, light from the source is gathered by a collector lens and then converted by a condenser lens to a collimated beam of light, which is essentially grainless, that illuminates the sample. The objective of the microscope forms an image of the sample on an image plane, either an observer's retina or a cameras detector surface.

Conventional microscopes control the realized numerical aperture of the optical system by use of an adjustable aperture stop between the light source and the slide. Opening the stop increases the numerical aperture, resulting in greater resolving power and light transmittance.

Recent microscopes have replaced the legacy filament light source with one or more light-emitting diodes (LEDs) but retained the optical elements between the LEDs and the slide.

SUMMARY

What is needed is a source of illumination that provides a simple and precise means of illuminating a sample being examined under a microscope and avoids the need to provide a collector, condenser, or aperture stop to control the realized numerical aperture of the microscope. The invention described herein fulfills this need.

BRIEF DESCRIPTION OF THE DRAWINGS

Aspects of the disclosure are herein described, by way of example only, with reference to the accompanying drawings. With specific reference now to the drawings in detail, it is stressed that the particulars shown are by way of example and are for purposes of illustrative discussion of aspects of the disclosure. The description and the drawings, considered alone and together, make apparent to those skilled in the art how aspects of the disclosure may be practiced.

FIG. 1 depicts a conventional microscope.

FIG. 2 is a cross-section of the optical elements of a conventional microscope.

FIG. 2A is an enlarged view of a portion of FIG. 2.

FIG. 3 depicts a portion of an exemplary microscope, according to certain aspects of the present disclosure.

DETAILED DESCRIPTION

Figures 4, 5, 6, 7, 8:
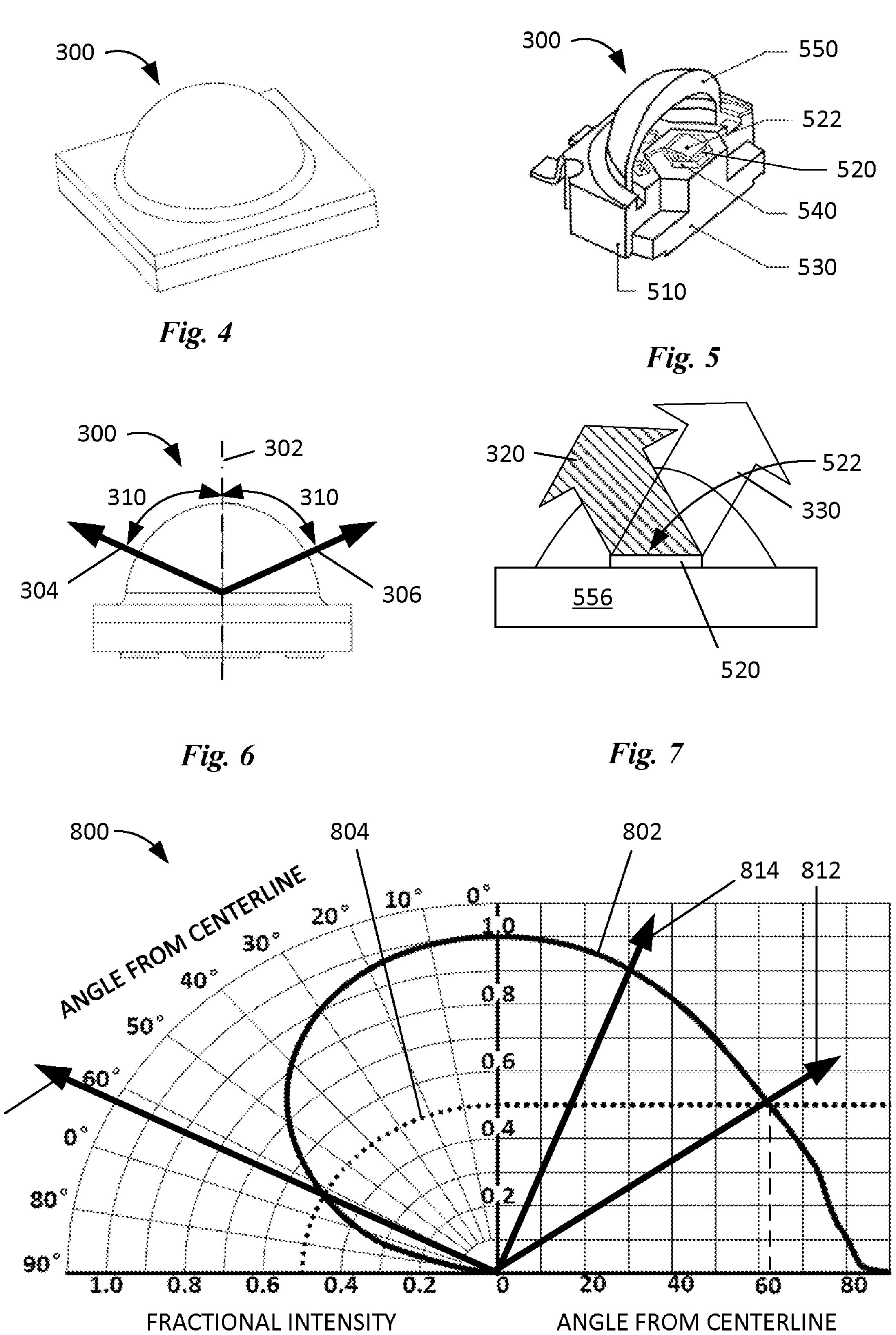
FIG. 4 is a perspective view of an exemplary illuminator, according to certain aspects of the present disclosure.
FIG. 5 is a cut-away view of an illuminator, according to certain aspects of the present disclosure.
FIG. 6 depicts the dispersive aspect of the illuminator, according to certain aspects of the present disclosure.
FIG. 7 depicts the near-field characteristic of light emitted by the illuminator, according to certain aspects of the present disclosure.
FIG. 8 is plot of the intensity of light emitted by illuminator over various angles, according to certain aspects of the present disclosure.

Changing the numerical aperture (NA) of the light source in a microscope changes the contrast, depth of field, and resolution of the microscope even with an objective having a fixed power of magnification and its own NA. Changing the NA of the light source is conventionally done with a diaphragm positioned at the condenser lens. Reducing the diaphragm opening reduces the NA of the light source. A small NA will have a higher contrast and larger depth of field with lower resolution and a reduced brightness (a darker image). The change in brightness can be compensated for by increasing the intensity of the light source. The resolution is maximized when the NA of the light source matches the NA of the objective. In certain situations, it is desirable to prioritize the contrast or limit the depth of field in order to better observe certain attributes of the sample.

The systems and methods disclosed herein achieve this same control of the light source NA by adjusting the separation distance between the illuminator, e.g., an LED, and the sample. The illuminator emits light over a fixed cone. Increasing the separation distance causes an outer portion of the light cone to not reach the objective within its entrance pupil, effectively limiting the NA of the light that is accepted by the entrance pupil. In this way, the meaningful NA of the light source, as determined by what portion of the source light is accepted by the entrance pupil of the objective, is controlled by adjusting the separation distance.

This description is intended to illustrate some particular embodiments of the disclosure and not to exhaustively specify all permutations, combinations and variations thereof. Features illustrated with respect to one embodiment may be incorporated into another embodiment, and features illustrated with respect to a particular embodiment may be deleted from that embodiment. In addition, numerous variations and additions to the various embodiments suggested herein will be apparent to those skilled in the art in light of the instant disclosure and do not depart from the instant disclosure. In some instances, well-known structures, interfaces, and processes have not been shown in detail in order not to unnecessarily obscure the invention. It is intended that no part of this specification be construed to effect a disavowal of any part of the full scope of the invention.

Unless otherwise defined herein, all technical and scientific terms used herein have the same meaning as commonly understood by one of ordinary skill in the art to which this disclosure belongs. The terminology used in the description of the disclosure herein is for the purpose of describing particular aspects or embodiments only and is not intended to be limiting of the disclosure. References to techniques employed herein are intended to refer to the techniques as commonly understood in the art, including variations on those techniques or substitutions of equivalent techniques that would be apparent to one of skill in the art.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein comprise one or more steps or actions for achieving the described method. The method steps and/or actions may be interchanged with one another without departing from the scope of the present disclosure. In other words, unless a specific order of steps or actions is required for proper operation of the embodiment, the order and/or use of specific steps and/or actions may be modified without departing from the scope of the present disclosure.

As used within this disclosure, the term "light" means electromagnetic energy having a wavelength within the range of 10 nanometers to 1 millimeter. In certain embodiments, this range is preferably 380-700 nanometers. In certain embodiments, this range is preferably 700-1000 nanometers.

As used in this disclosure, the phase "optical element" includes any object that modifies the path of a light ray that impinges upon the device, including refractive elements (e.g., a lens), reflective elements (e.g., a mirror), and opaque non-reflective elements (e.g., a stop with an aperture). This phrase does not include fiber optic cables.

As used in this disclosure, the phrase "optical path" refers to the collective paths of light from a source of light through a microscope to an observer, including both human observers and observing devices such as a camera. The scope of this phrase does not include paths of light that is not accepted by the microscope objective or otherwise blocked from reaching the observer or observing device.

As used in this disclosure, the phrase "light shaping" and related terms refer to methods and apparatus that variably redirect, e.g., focus or disperse a light beam by means of refraction or reflection, or block a portion of a beam of light. This includes fixed and variable apertures. This does not include methods and apparatus that provide planar reflection, e.g., a uniform redirection of the beam of light, or planar transmission, e.g., passing through a material having parallel planar opposite surfaces, wherein the output beam propagates in a direction parallel to the input beam.

As used in this disclosure, the term "condenser" includes conventional single-lens or multiple-lens microscope condensers and functional equivalents.

As used in this disclosure, the term "slide" includes conventional rectangular glass slides as well as other structures and materials configured to equivalently support a sample for optical examination.

FIG. 1 depicts a conventional microscope 10. A typical microscope has a base 12 and a slide holder 14 configured to accept a slide (not shown). The objective 20 may include multiple lenses and eyepieces to observe a sample disposed on the top surface of the slide and form an image on the retain of a person looking into the eyepieces. In certain embodiments, a camera replaces the eyepieces and the image is then formed on a detector surface of the camera. The example microscope 10 also has an adjustment apparatus 16 to raise and lower the objective 20, relative to the slide holder, to focus the image. A light source 40 is attached to the base 12 and projects light through a condenser lens assembly 30 disposed under the slide holder 14 and through the sample on the slide.

FIG. 2 is a cross-section of the optical elements of a conventional microscope. A beam of collimated light 42 from a light source 40 (not shown in FIG. 2) enters a condenser assembly 100 through an aperture 105 in a condenser stop, which is embodied in this example as an adjustable diaphragm 104 wherein the diameter of the aperture 105 can be adjusted. The condenser 100 includes light-shaping optical elements, e.g., lenses 114 and 116, that together form the optical condenser 110. These light-shaping elements may be transmissive or reflective, may act as a fixed or adjustable stop or pupil, and may be configured to focus or collimate incident light. a component that does not affect the collective focus of the light, e.g., a transparent glass slide, is not considered a light-shaping element.

A slide 50 is disposed on the slide holder 14. A sample 60, which is a thin piece of tissue in certain usage such as pathology, is disposed on a top surface of the slide 50 and a cover slip 52 is disposed over the sample 60.

An objective assembly 120 includes a housing 121. Lenses 132, 133, 134, 135, 136, 137 have shapes and materials that refract the light while providing correction for aberrations in form and color and, along with lens 132, together form the optical objective 130.

Rays 44, 46, 48 trace example paths of portions of the light beam 42 through the system. The rays 44, 46, 48 are collimated when they enter the condenser assembly 100, indicating that a collector lens (not shown) is positioned proximate to the light-emitting body, e.g., a heated filament, and configured to collimate the light. The rays emanating from a point on the sample will form an image of the sample 60 at any plane where the rays 44, 46, 48 are again focused to a point. The purpose of the collector and condenser 110 are to provide illuminating light without introducing an image of the light source into the image of the sample at the eyepiece or camera.

Adjusting the aperture 105 through manipulation of the diaphragm 104 has several effects on the image of the sample 60. Reducing the aperture increases the depth of field, much like a camera, as well as increasing the contrast between lighter and darker portions of the image. The tradeoff is that reducing the aperture also reduces the resolution.

FIG. 2A is an enlarged view of a portion of FIG. 2. As lens 132 is the first lens of the objective 130, it is convenient to talk about this lens having an entrance aperture 124 and an acceptance half-angle 126, measured from an optical axis 122 of lens 132 to the limiting rays 128. Light that reaches lens 132 within the aperture 124 and at a half-angle from the optical axis 122 that is less than the acceptance half-angle 126 will pass through the objective 130 and reach the observer or camera.

FIG. 3 depicts a portion of an exemplary microscope, according to certain aspects of the present disclosure. The objective assembly 120 is conventional. The condenser assembly 100 has been replaced with an illuminator 300 surface configured to project light onto an underside of the top surface of the slide 50 when the slide 50 is accepted by the slide holder (not shown). There is no optical element, e.g., a condenser, a collector, and a stop as provided in conventional microscopes, disposed between the illuminator and the slide holder.

FIG. 4 is a perspective view of an exemplary illuminator 300, according to certain aspects of the present disclosure.

FIG. 5 is a cut-away view of an illuminator 300, according to certain aspects of the present disclosure. The illuminator 300 has a housing 510 with a dome 550 that is transparent to at least a portion of the spectrum of visible light. A light-emitting device 520 having a light-emitting surface 522 is positioned under the dome 550 and attached to a support 540 that is, in turn, attached to a heat sink 530. In certain embodiments, the dome 550 is transparent to at least a portion of the visible spectrum of light. In certain embodiments, the dome 550 is coated, e.g., a fluorescent coating that is energized by light emitted from the light-emitting device 520 and emits light outward in response. In certain embodiments, the dome 550 is shaped to refract light from the light-emitting surface 522 into a desired distribution, such as shown in FIG. 8. In certain embodiments, the dome 550 is shaped to avoid refracting the light from the light-emitting surface 522.

In certain embodiments, the light-emitting surface 522 is one of circular, rectangular, square, or other shape. The light-emitting surface 522 has at least a width, e.g., the diameter of a circular surface. The light-emitting surface 522 may also have a length, e.g., a rectangular surface 522 with a width and length, wherein the length is greater than or equal to the width unless stated otherwise.

In certain embodiments, the illuminator 300 emits light having a defined characteristic, for example a color. In certain embodiments, the illuminator 300 emits "white" light. In certain embodiments, the illuminator emits light generally having a characteristic color temperature, for example 2700 K. In certain embodiments, the illuminator emits light over one or more ranges of wavelengths. In certain embodiments, the illuminator comprises multiple light-emitting surface s, each one emitting light over a different range of wavelengths. In certain embodiments, the intensity of light within a range is generally uniform.

FIG. 6 depicts the dispersive aspect of the illuminator 300, according to certain aspects of the present disclosure. The light emitted by the illuminator 300 has a spatial distribution that is symmetric about an optical axis 302. Rays 304, 306 are at a common half-angle 310 from the optical axis 302 and therefore have a common intensity.

FIG. 7 depicts the near-field characteristic of light emitted by the illuminator, according to certain aspects of the present disclosure. Light is emitted over nearly 180 degrees by every point on the light-emitting surface 522. In effect, a collimated beam of light of uniform intensity is emitted at every angle. A light beam 320 is emitted in a first direction while a light beam 330 is emitted in a second direction. The intensity of each beam depends on the half-angle at which it has been emitted.

FIG. 8 is plot 800 of the intensity of light emitted by illuminator 300 over various angles, according to certain aspects of the present disclosure. The curve 802 of the emitted intensity is unique to each design of illuminator 300. Curve 804 is plotted to indicate the 50% intensity threshold. The plot 800 is divided into two halves by the center intensity axis, where light emitted perpendicular, i.e., along the centerline, to the light-emitting surface 522 has been scaled to unity (magnitude=1.0).

The left half of plot 800 is presented in polar coordinates, wherein the half-angle from the centerline is marked around the periphery of the grid. The intensity of the light at each angle is indicated by the radial distance of the curve 802 from the center. Arrow 810 passes through the intersection of curves 802 and 804 and intersects the perimeter angle at approximately 63 degrees, which indicates that the intensity of light emitted at 63 degrees is half of the intensity emitted perpendicular to the light-emitting surface.

The right half of plot 800 presents the same information in rectilinear coordinates. The half-angle from the centerline is now indicated along the x-axis while the magnitude is marked along the y-axis. Arrow 812 passes through the intersection of curves 802, 804 and indicates that the 50% magnitude light is emitted at approximately 63 degrees. Arrows 810, 812 therefore provide the same information in the two graphs.

Arrow 814 indicates that light emitted at a half-angle of 30 degrees has 90% of the intensity of light emitted along the centerline. Intensities of light emitted at any angle can be determined in a similar way from either half of plot 800, noting that the curve 802 drops to zero at 90 degrees.

Figures 9, 10, 11, 12:
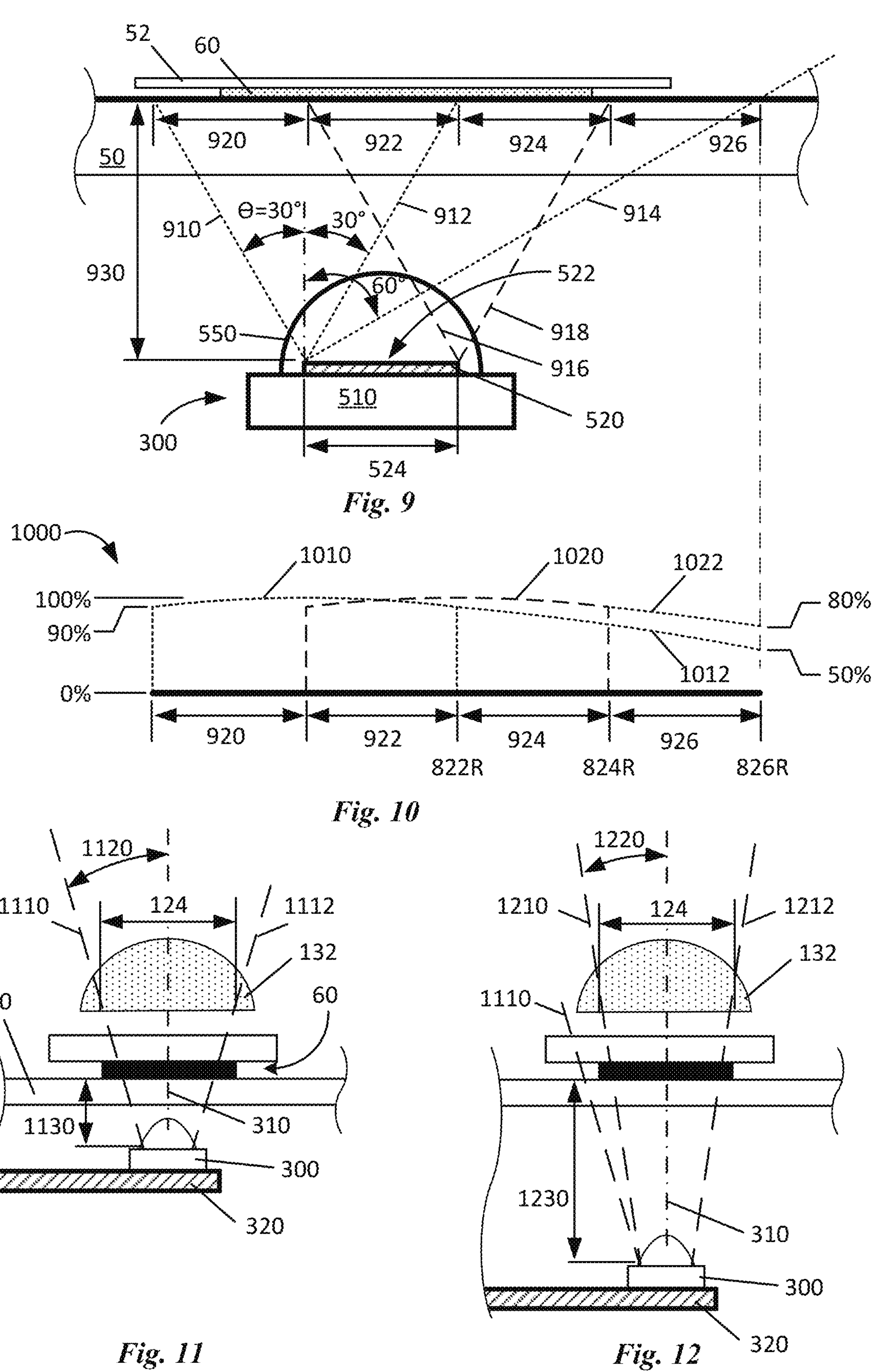
FIG. 9 depicts an exemplary disposition of an illuminator relative to a slide, according to certain aspects of the present disclosure.
FIG. 10 is a plot of the intensity of light projected by the illuminator onto the slide, according to certain aspects of the present disclosure.
FIGS. 11-12 depict the angle of light received by an objective at various distances of the illuminator from the slide, according to certain aspects of the present disclosure.

FIG. 9 depicts an exemplary disposition of an illuminator 300 relative to a slide 50, according to certain aspects of the present disclosure. When the separation distance 930 of the light-emitting surface from the top surface of the slide 50 is the same order of magnitude as the width 524 of the light-emitting surface 522, it is sometimes referred to as the "near field." In this example, the separation distance 930 has been chosen to be the width 524 multiplied by the square root of 3, making the areas 920, 922, 924 the same width as width 524 for convenience in plotting the intensities in FIG. 10. This two-dimensional example can be extrapolated to other planes or three dimensions as the concepts are the same.

The light-emitting surface 522 has a width 524. Light emitted perpendicular from the light-emitting surface 522 uniformly illuminates area 922 on the underside of the top surface of slide 50. Light emitted at a non-zero half-angle from any point on the light-emitting surface 522 also may also illuminate a portion of area 922 as well as additional areas of the top surface. In this example, rays 910, 912 indicate light emitted at a half-angle of 30 degrees from the left edge of the light-emitting surface 522. The separation distance 930 between the light emitting surface and the top surface of the slide 50 is selected that ray 912 reaches the right edge of area 922 while ray 910 reaches the left edge of area 920. Similarly, rays 916, 918 emanating at 30 degrees from the right edge of the light-emitting surface 522 reach the left edge of area 922 and the right edge of area 924, respectively. Area 922 is thus illuminated by rays of less than 30 degrees from the entire light-emitting surface 522.

Arrow 914, which is emitted from the left edge of light-emitting surface 522 at a half-angle of 60 degrees (and 50% of the intensity of the perpendicular light) indicates that light emitted at higher half-angles reaches the top surface well beyond the area covered by the sample 60 and therefore is of no concern in this application.

The area of sample 60 observed through an objective is referred to as "the Field Of View" (FOV). The FOV at a given magnification is determined by the Objective Field Number (OFN) of the objective divided by the magnification:

$$OFN = FOV/\text{magnification}$$

For example, an exemplary objective has a magnification of 20 and an OFN of 26.5, resulting in a FOV diameter of approximately 1.3 mm. A 40× objective with the same OFN of 26.5 has a FOV of approximately 0.7 mm. If this FOV is smaller than the area 922, the entire FOV receives only light having an angle of less than 30 degrees.

FIG. 10 is a plot 1000 of the intensity of light projected by the illuminator 300 onto the slide 50, according to certain aspects of the present disclosure. FIG. 10 is scaled and aligned with FIG. 9 to align the plotted information of FIG. 10 with the physical arrangement of FIG. 9.

Curve 1010 is the distribution of intensity from FIG. 8 for light emitted from the left edge of the light-emitting surface 522. Curve 1020 is the same distribution for light emitted from the right edge of the light-emitting surface 522. In each curve, the center intensity is the highest and the intensities at the left and right edges of the curves are only 10% less than the center intensity.

Illumination of a sample 60 in microscopy should be generally uniform in order to produce the best image. The observed area of a sample is inversely proportional to the degree of magnification of the objective, e.g., higher magnification provides an image of a smaller area of the sample. The microscope and illuminator disclosed herein are particularly advantageous when the width of the observed area is no larger than the width of the light-emitting surface.

The total intensity of light received within an area is the sum total of light received at any angle from any point on the light-emitting surface 522. For area 922, curves 1010, 1020 represent the limiting cases if the angle is constrained to 30 degrees. This constrains the lowest intensity received to 90%, ensuring that the total intensity of any point within area 922 must be within the range from the peak intensity (100%) down to the lowest received intensity (90%). As any point in area 922 receives perpendicular light as well as light at half-angles that vary from zero to 30 degrees, in this example, the actual total intensity at that point is closer to the average of the peak and minimum intensities.

If the FOV of an objective is less than the smallest dimension, e.g., width or length or diameter, of the light-emitting surface when the separation distance is equal to at least the smallest dimension multiplied by the arcsine of the 90% intensity half-angle, the entire FOV will be illuminated by a generally uniform intensity of light. In certain embodiments, the intensity of illumination will be within a range of 10%. In certain embodiments, the intensity of illumination will be within a range of 5%.

Dashed line 1022 is an extrapolation of curve 1010 according to FIG. 8 and shows how the intensity of light emitted from the left edge drops off as the half-angle increases. At the right edge of area 926, the intensity of light from the left edge is only 50% of the center intensity. Dashed line 1022 repeats this extrapolation for curve 1020, showing that light from the right edge of the light-emitting surface 522 reaches the right edge of area 926 at a lower half-angle that is at 80% of the peak intensity.

FIGS. 11-12 depict the angle of light received by an objective 132 at various distances of the illuminator 300 from the slide 50, according to certain aspects of the present disclosure.

FIG. 11 depicts the acceptance half-angle 1120 and the aperture 124 of lens 132, which is the first lens of objective 130. Lines 1110, 1112 depict the maximum angle of rays of light emitted over the entire light-emitting surface 522 (not visible in FIGS. 11-12) of illuminator 300 that will be accepted by the objective 132. Light reaching the aperture 124 of the lens 132, which can be considered the aperture of the entire objective 130, at an arrival angle that is less than or equal to the acceptance angle 1120 will propagate through the objective 130 to form an image for an observer or camera.

FIG. 12 depicts the same system as FIG. 11 with the separation distance 1130 increased to separation distance 1230. Rays 1210, 1212 depict the maximum angle of rays of light emitted over the entire light-emitting surface 522 of illuminator 300 that will be accepted by the objective 132. Ray 1110 is copied from FIG. 11 for reference, showing that ray 1210 has a smaller half-angle than ray 1110. This indicates that the acceptance angle for light from the light-emitting surface 522 is lower when the separation distance is greater.

Comparison of FIGS. 11 and 12 illustrate how changing the separation distance of the disclosed microscope changes the half-angle of light accepted by the objective, thereby changing a realized numerical aperture of the microscope. Increasing the separation distance reduces the arrival angle of light emitted by the light-emitting surface that reaches the aperture of the objective, thereby reducing the realized numerical aperture of the microscope. The opposite is also true—reducing the separation distance increases the arrival angle of light emitted by the light-emitting surface that reaches the aperture of the objective, thereby increasing the realized numerical aperture of the microscope.

Overall, the system disclosed in FIGS. 11-12 is simpler than the conventional system of FIG. 2, in that multiple expensive lenses are absent, which has the subsequent elimination of the housing and the need to precisely align the lenses. The disclosed system, which does not require an optical element to shape or restrict the illuminator's light, will be simpler and less expensive than a comparable conventional microscope lighting system.

FIGS. 13-18 are images made during experimental operation of a microscope equipped with an illuminator in place of the conventional condenser and diaphragm. In this test, the illuminator comprises a variable-intensity LED. The microscope objective was 40× with a NA of 0.75.

Figure 13:
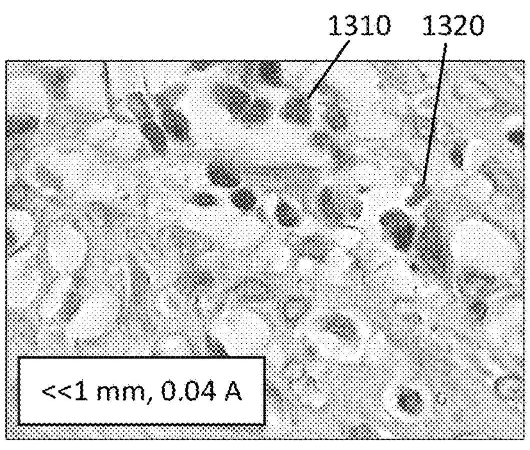
FIGS. 13-15 are images of a tissue sample at various distance of the illuminator from the slide, according to certain aspects of the present disclosure.

FIG. 13 is an image of a tissue sample with the illuminator at a small distance (<<1 mm) from the slide. The electrical current provided to the LED has been adjusted to 0.04 A. Certain features of the sample, for example features 1310 and 1320, are fuzzy both in outline and in the shading within the features. The contrast is high enough that the internal details of feature 1310 are all dark and difficult to distinguish from each other.

Figure 14:
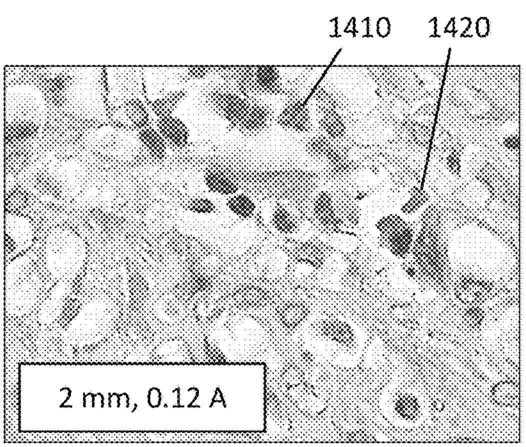

FIG. 14 is the same tissue sample as FIG. 13 with the illuminator at 2 mm from the slide. The electrical current provided to the LED has been adjusted to 0.12 A to achieve a brightness approximately the same as that of FIG. 13. The contrast has been reduced by the effective reduction in the light source NA that the internal details of feature 1410 more differentiated in darkness than the same feature 1310 at the higher effective NA. The resolution is also increased, as the border of feature 1420 is sharper and the feature is more differentiated with a dark border and a lighter interior.

Figure 15:
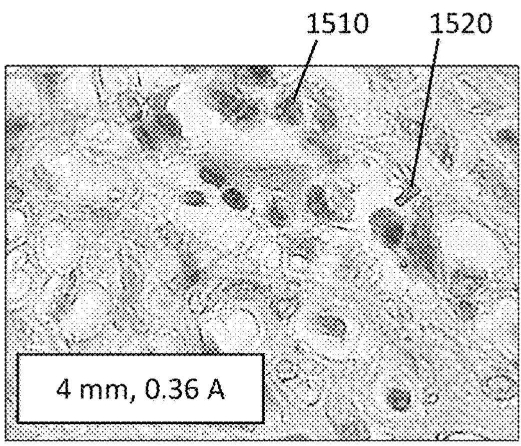

FIG. 15 is the same tissue sample as FIG. 13 with the illuminator at 4 mm from the slide. The electrical current provided to the LED has been adjusted to 0.36 A to approximately maintain the same brightness. Portions of the border of feature 1510 and the entire border of feature 1520 are sharper and more visible than in FIGS. 13-14. Certain other features of the sample show structure not visible in FIGS. 13-14, which may be an attribute of a reduction of the depth of field to less than the full thickness of the feature such that only a portion of the feature structure is in focus.

Figure 16:
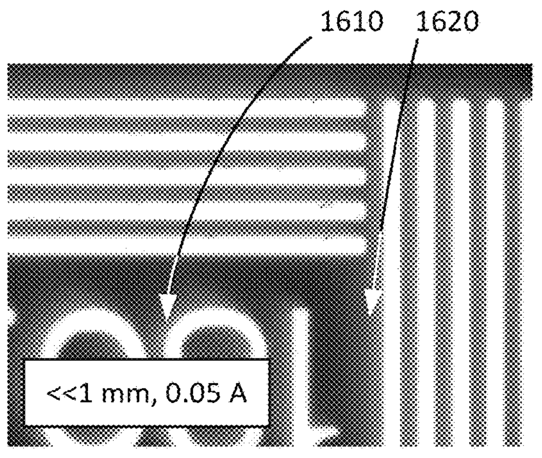
FIGS. 16-18 are images of an optical reference slide at various distance of the illuminator from the slide, according to certain aspects of the present disclosure.

FIG. 16 is an image of a portion of a standard optical reference slide with the illuminator positioned very close (<<1 mm) from the slide. The electrical current provided to the LED has been adjusted to 0.05 A. Certain features of the sample, for example the edge 1610 of the number "8" and the edge 1620 of the white line, are fuzzy.

Figure 17:
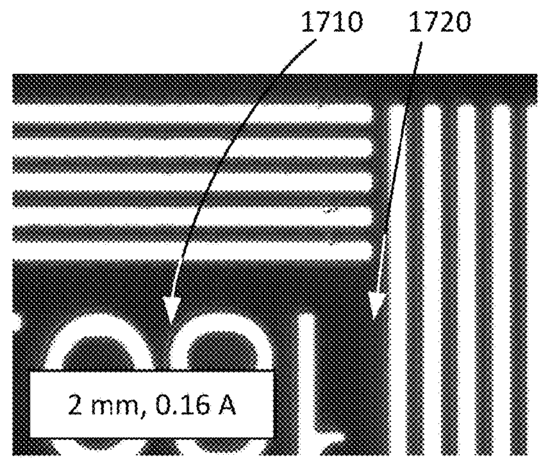

FIG. 17 is the same reference slide as FIG. 16 with the illuminator at 2 mm from the slide. The electrical current provided to the LED has been adjusted to 0.16 A to approximately provide the same brightness as FIG. 16. The edges 1710, 1720 are noticeably sharper than the respective surfaces 1610, 1620 of FIG. 16.

Figure 18:
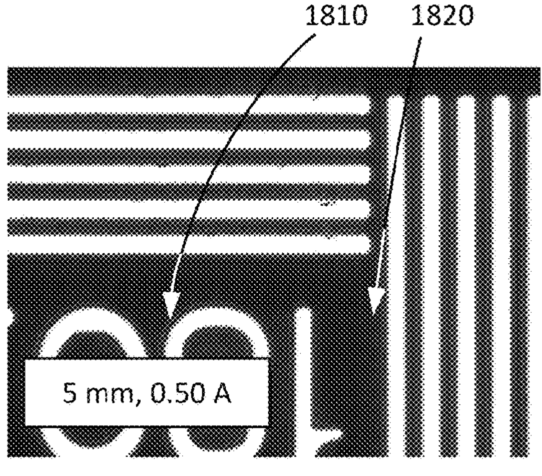

FIG. 18 is the same reference slide as FIG. 16 with the illuminator at 5 mm from the slide. The electrical current provided to the LED has been adjusted to 0.50 A to approximately maintain the same brightness. The sharpness of the edges 1810, 1820 are not noticeably increased relative to FIG. 17, which may be a result of the planar image, i.e., no thickness, the uniformly sharp edges, and having only black and white in the image.

In summary, the tests demonstrated that changing the separation distance between the disclosed illuminator and the slide has the same effects as closing a conventional diaphragm—increasing the resolution and decreasing the depth of field.

As used in the description of the disclosure and the appended claims, the singular forms "a," "an" and "the" and the like are intended to include to be interpreted as equivalent to the phrase "at least one" and comprise the plural forms as well, unless the context clearly indicates otherwise. Reference to an element in the singular is not intended to mean "one and only one" unless specifically so stated.

As used in the description of the disclosure and the appended claims, pronouns in the masculine (e.g., his) include the feminine and neuter gender (e.g., her and its) equivalent and vice versa.

As used herein, "and/or" refers to and encompasses any and all possible combinations of one or more of the associated listed items as well as singular usage of each item.

As used in the description of the disclosure and the appended claims, terms such as "top," "bottom," "upper," "lower," "left," "right," "front," "rear," and the like should be understood as referring to an arbitrary frame of reference. Thus, a top surface may extend upwardly, downwardly, diagonally, or horizontally in a particular embodiment without limiting the orientation in other embodiments.

As used herein, the terms "aspect" and "embodiment" are used to identify examples as to how the disclosure may be utilized and do not necessarily identify features or components that essential to the subject technology or that apply to all configurations of the subject disclosure. A disclosure relating to an aspect may apply to all configurations, or one or more configurations.

As used herein, the term "exemplary" means "serving as an example or illustration." Any aspect or design described herein as "exemplary" is not necessarily to be construed as preferred or advantageous over other aspects or designs.

The terms "about" and "approximately" as used herein when referring to a measurable value such as a length, a frequency, or a position and the like, is meant to encompass variations of ±20%, ±10%, ±5%, ±1%, ±0.5%, or even ±0.1% of the specified amount.

As used herein, the terms "include," "contain," "has," "have," and the like are intended to be inclusive in a manner similar to the term "comprise" as interpreted when employed as a transitional word in a claim.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other embodiments such as curved or tapered.

Headings and subheadings, if any, are used for convenience only and do not limit the invention.

Embodiments

A1. A microscope, comprising: a base; a slide holder coupled to the base and configured to accept a slide; and an illuminator movably coupled to the base and comprising a light emitting surface configured to project light on an optical path toward the slide when the slide is accepted by the slide holder; wherein: there is no light-shaping apparatus disposed on the optical path between the illuminator and the slide holder.

A2. The microscope of A1, wherein the illuminator can be moved along the optical path with a separation distance between the light-emitting surface and the slide.

A3. The microscope of A2, further comprising: an objective coupled to the base and disposed so as to observe a portion of the slide illuminated by the projected light; wherein: the objective has an aperture and an acceptance angle; the projected light reaches the aperture of the objective within an arrival angle that is inversely related to the separation distance; increasing the separation distance reduces the arrival angle of the projected light that enters the aperture of the objective, thereby reducing a realized numerical aperture of the microscope.

A4. The microscope of A2, wherein: the illuminator has an adjustable intensity; and the intensity is adjusted automatically based in part on the separation distance.

A5. The microscope of A4, wherein the intensity is adjusted automatically to maintain a selected brightness as the separation distance is changed.

A6. The microscope of A1, wherein the illuminator comprises a light emitting diode (LED).

A7. The microscope of A6, wherein: the objective has a Field of View (FOV) with a first smallest dimension; the light-emitting surface has a second smallest dimension; the projected light has a peak intensity on an axis perpendicular to the light-emitting surface and a 90% intensity at a determined half-angle from the perpendicular axis; the projected light has an intensity over the entire FOV that is within a range of 10% of the peak intensity when the separation distance is at least the arcsine of the half-angle.

A8. The microscope of A7, wherein changing the separation distance changes the realized numerical aperture of the microscope.

A9. The microscope of A1, wherein the projected light is essentially grainless.

B10. An illuminator for use with a microscope having a base, a slide holder configured to accept a slide, and an objective having a Field Of View (FOV) covering a portion of an accepted slide, the illuminator comprising a light emitting surface and configured to be movably coupled to the base, wherein a clear and focused image can be provided by the objective with no light-shaping optical element disposed along an optical path from the illuminator to the accepted slide.

B11. The illuminator of B10, wherein: the illuminator is movable with respect to the base to selectably determine a separation distance between the light-emitting surface and the slide; the light emitting surface configured to project light on the optical path; the projected light has a peak intensity on an axis perpendicular to the light-emitting surface and a 90% intensity at a determined first half-angle from the perpendicular axis; the projected light has an intensity over the entire FOV that is within a range of 10% of the peak intensity when the separation distance is at least the arcsine of the half-angle.

B12. The illuminator of B11, wherein changing the separation distance changes the realized numerical aperture of the microscope.

C13. A method of operating a microscope, comprising: projecting light from a planar light-emitting surface directly onto an underside of a slide accepted by the microscope; and adjusting a separation distance between the light-emitting surface and the underside of the slide to achieve a selected value of a realized numerical aperture of the microscope.

C14. The method of C13, wherein: the light emitted by the light-emitting surface has an intensity that is uniform within a defined range over a dispersion cone having a defined half-angle; the projected light is not shaped between the light-emitting surface and the underside of the slide; and increasing the separation distance reduces a maximum half-angle of the emitted light that enters an entrance aperture of an objective of the microscope.

C15. The method of C14, wherein: the light-emitting surface comprises a light emitting diode (LED); and reduces the maximum half-angle of the emitted light that enters the entrance aperture of the objective reduces the realized numerical aperture of the microscope.

All structural and functional equivalents to the elements of the various aspects described throughout this disclosure are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Although embodiments of the present disclosure have been described and illustrated in detail, it is to be clearly understood that the same is by way of illustration and example only and is not to be taken by way of limitation, the scope of the present invention being limited only by the terms of the appended claims.

I claim:

1. A microscope, comprising:

a base;

a slide holder coupled to the base and configured to accept a slide;

an illuminator movably coupled to the base and comprising a light emitting diode (LED) having a light-emitting surface configured to project light on an optical path toward the slide with a separation distance between the light-emitting surface and the slide when the slide is accepted by the slide holder; and an objective coupled to the base and disposed so as to observe a portion of the slide illuminated by the projected light;

wherein:

there is no light-shaping optical element disposed on the optical path between the illuminator and the slide holder;

the objective has a Field of View (FOV);

the projected light has a peak intensity on an axis perpendicular to the light-emitting surface and a 90% intensity at a determined half-angle from the perpendicular axis; and the projected light has an intensity over the entire FOV that is within a range of 10% of the peak intensity when the separation distance is at least the arcsine of the half-angle.

2. The microscope of claim 1, wherein the illuminator can be moved along the optical path.

3. The microscope of claim 2, wherein:

the objective has an aperture and an acceptance angle;

the projected light reaches the aperture of the objective within an arrival angle that is inversely related to the separation distance; and increasing the separation distance reduces the arrival angle of the projected light that enters the aperture of the objective, thereby reducing a realized numerical aperture of the microscope.

4. The microscope of claim 3, wherein changing the separation distance changes the realized numerical aperture of the microscope.

5. The microscope of claim 2, wherein:

the illuminator has an adjustable intensity; and the intensity is adjusted automatically based in part on the separation distance.

6. The microscope of claim 5, wherein the intensity is adjusted automatically to maintain a selected brightness as the separation distance is changed.

7. The microscope of claim 1, wherein the projected light is essentially grainless.

8. An illuminator for use with a microscope having a base, a slide holder configured to accept a slide, and an objective having a Field Of View (FOV) covering a portion of an accepted slide, the illuminator comprising a light-emitting surface and configured to be movably coupled to the base, wherein a clear and focused image can be provided by the objective with no light-shaping optical element disposed along an optical path from the illuminator to the accepted slide;

wherein:

the illuminator is movable with respect to the base to selectably determine a separation distance between the light-emitting surface and the slide;

the light emitting surface configured to project light on the optical path;

the projected light has a peak intensity on an axis perpendicular to the light-emitting surface and a 90% intensity at a determined first half-angle from the perpendicular axis;

the projected light has an intensity over the entire FOV that is within a range of 10% of the peak intensity when the separation distance is at least the arcsine of the half-angle.

9. The illuminator of claim 8, wherein changing the separation distance changes the realized numerical aperture of the microscope.

10. A method of operating a microscope, comprising:

projecting light from a planar light-emitting surface directly onto an underside of a slide accepted by the microscope; and adjusting a separation distance between the light-emitting surface and the underside of the slide to achieve a selected value of a realized numerical aperture of the microscope;

wherein:

the light emitted by the light-emitting surface has an intensity that is uniform within a defined range over a dispersion cone having a defined half-angle;

the projected light is not shaped between the light-emitting surface and the underside of the slide; and increasing the separation distance reduces a maximum half-angle of the emitted light that enters an entrance aperture of an objective of the microscope.

11. The method of claim 10, wherein:

the light-emitting surface comprises a light emitting diode (LED); and reduces the maximum half-angle of the emitted light that enters the entrance aperture of the objective reduces the realized numerical aperture of the microscope.

* * * * *